Patented Jan. 20, 1953

2,626,273

UNITED STATES PATENT OFFICE 2,626,273

PREPARATION OF ALKOXY HYDROSILANES

Melvin J. Hunter and Philip C. Servais, Midland, Mich., assignors to The Dow Chemical Company, Midland, Mich., a corporation of Delaware No Drawing. Application November 5, 1947, Serial No. 784,292

7 Claims. (Cl. 260—448.8)

This invention relates to the manufacture of organo silicon compositions and intermediates and is particularly concerned with reactions involving silanes which have hydrogen substituents attached to silicon atoms.

In the commercial manufacture of siloxanes, silanes having one or more hydrolyzable groups per silicon atom are hydrolyzed and condensed. By hydrolyzable groups is meant, in general, any atom or radical which is attached to the silicon by other than carbon-silicon linkage, and which is more readily hydrolyzed than an organic radical attached to the silicon through a carbon-silicon linkage. Hydrolyzable groups include halides, and alkoxy radicals. For some uses, alkoxy silanes are more desirable than chloro silanes, since the latter produces hydrogen chloride upon hydrolysis. This results in corrosion of metals and weakening of fabrics.

Several methods of accomplishing alteration of silane substituents have been described in the prior art. For example, Ladenberg (Ann. 160, 300, 1872) describes the conversion of diethyl diethoxy silane to diethyl dichloro silane by reacting the ethoxy compound in a closed tube at 300° C. using benzoyl chloride as a source of chlorine. However, in this reaction the amount of interchange is low and conditions are such that they are not adapted to commercial utilization. It has been proposed to use an alcohol or ether as a source of alkoxy radicals to convert chloro silanes to their corresponding alkoxy derivatives. However, this method is unsatisfactory for use in connection with silane having hydrogen linked to the silicon, because when such compounds are reacted with alcohol, hydrogen substituents frequently are replaced by alkoxy radicals as well as chlorine substituents. In other words, all hydrolyzable substituents generally are replaced by alkoxy radicals.

It is an object of the present invention to provide a method for replacing chlorine atoms on chlorosilanes which have a hydrogen bonded to the silicon.

Another object of the invention is to provide a method of producing compounds which can be hydrolyzed and condensed on the surface of cloth, paper, ceramics and the like without formation of undesirable by-products.

Other objects and advantages of the invention will be apparent from the following description.

In accordance with the present invention, a chloro silane which has a hydrogen atom bonded to the silicon is reacted in liquid phase with a silane ester having the formula $R_{4-n}Si(OR')_n$, wherein R represents a monovalent hydrocarbon radical, such as alkyl or aryl, R' represents an alkyl radical, and $n$ is a positive integer from 1 to 4. Chlorosilanes employed have the general formula $R_mHSiCl_{3-m}$ where $m$ is a number from 0 to 2 and R is an alkyl radical. As a result of this reaction, one or more chlorine atoms of the chlorosilane is interchanged with a corresponding number of alkoxy radicals of the silane ester, to form compounds having alkoxy and hydrogen substituents attached to the same silicon atom. The reaction products may thereafter be separated by suitable means. Presence of a minor proportion of a free acid promotes the foregoing reactions.

Chlorosilanes which are employed, and are of the type $R_mHSiCl_{3-m}$ where $m$ is a number from 0 to 2, include trichlorosilane and silanes which are derivatives thereof in which one or two of the chlorines are substituted with an alkyl or aryl radical. Such alkyl and aryl substituents are inert, as contrasted to the hydrogen and chlorine substituents. These chlorosilanes are formed during the commercial manufacture of organo-silicon compounds.

Esters employed to interchange with the chlorosilanes are alkyl orthosilicates and derivatives thereof in which from one to three alkyl or aryl radicals are substituted for alkoxy radicals. In this case also the alkyl and aryl radicals are inert as compared with the alkoxy radicals.

It has been found that when alkoxy silanes are employed in the process hereof hydrogen is not cleaved from the silicon as occurs when an alcohol is employed to interact with the chlorosilanes which contain hydrogen bonded to the silicon.

In carrying out the invention, the silane ester preferably is employed in amount sufficient to provide alkoxy radicals for interchange with all chlorine atoms present in the hydrochlorosilane. To insure the foregoing, it may be desirable to employ a slight excess of the ester. However, in those instances, wherein it is desired to remove less than the total chlorine of the hydrochlorosilane, the silane ester may be employed in amount sufficient to provide alkoxy radicals for interchange with that portion of the chlorine which it is desired to remove.

The rate of reaction is substantially increased by the use of free acid in the reaction mixture. To obtain this increase in reaction rate, it is desirable that sufficient acid be present to make the mixture acidic, preferably 0.03% by weight or more. Increase in the proportion of acid increases the rate of reaction. It is generally desirable to use not more than 2% by weight, as with larger amounts the process hereof may proceed at a faster rate than can be managed with facility. Acids which we have found suitable include the common inorganic acids, such as HCl, $H_2SO_4$, and the like. Frequently there is sufficient free HCl already present in the hydrochlorosilane, either as an impurity or formed in situ by reaction of the hydrochlorsilane with atmospheric moisture, to promote reaction at a satisfactory rate. If this is not the case, acid may be added either as a liquid or as a gas passed through the mixture. Alternatively, HCl may be formed in situ by adding a small proportion of alcohol to the mixture. Reaction between the alcohol and the hydrochlorosilane results in the formation of HCl.

Interchange reactions of the present invention are exothermic and generally commence upon mixing of the reactants. A convenient method of controlling the reactions is by allowing the heat of reaction to cause boiling and by refluxing the materials so boiled, the reaction being judged complete when the temperature falls or refluxing ceases. This provides for the removal of the heat of reaction. As is known, the specific temperature at which the reaction mixture is held is capable of being controlled by adjusting the pressure on the refluxing mixture. With adequate indirect temperature control, the reaction mixture may be maintained at any desired temperature below that at which refluxing occurs.

Silane products obtained by practicing the invention are, when pure, water white liquids containing one hydrogen substituent, and at least one alkoxy substituent, the remaining silicon bonds, if any, being satisfied by monovalent hydrocarbon radicals. Examples of such compounds are $(CH_3)_2HSiOC_2H_5$, $C_2H_5HSi(OC_2H_5)_2$

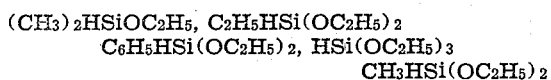

$CH_3HSi(OC_2H_5)_2$ and the like. Silanes produced in accordance herewith are adapted to be used in numerous applications. Specifically they may be applied to fabrics, glass cloth, ceramics and the like, and condensed thereon to render the materials water repellant. Heretofore, when silanes were condensed in this manner, considerable difficulty was encountered due to acidic by-products of the condensation, such as HCl, attacking the base material.

A better understanding of the invention may be obtained from the following illustrative examples:

Example 1

Three mols of $(CH_3)_3SiOC_2H_5$ and one mol of $HSiCl_3$ were combined. Reaction began immediately upon mixing of the silanes and it was necessary to cool the reaction vessel to prevent loss of $HSiCl_3$. After completion of the reaction, the mixture was fractionally distilled. $HSi(OC_2H_5)_3$ was obtained in amount equal to 84% of theoretical, based on the $HSiCl_3$ starting material.

Example 2

Equal molar amounts of $(CH_3)_3SiOC_2H_5$ and $(C_6H_5)_2HSiCl$ were combined and dry HCl gas was passed through the mixture. After four hours reaction was complete. $(C_6H_5)_2HSiOC_2H_5$ and $(CH_3)_3SiCl$ were obtained in substantially theoretical amounts.

Example 3

503 g. (4.26 mols) of $(CH_3)_3SiOC_2H_5$ were added to 234 g. (2.03 mols) of $CH_3HSiCl_2$ followed by the addition of 159 g. (.76 mol) of $Si(OC_2H_5)_4$. After reaction was complete, the mixture was fractionated whereby there was obtained 368.6 g. (3.4 mols) of $(CH_3)_3SiCl$, 159.2 g. (1.35 mols) of $(CH_3)_3SiOC_2H_5$, and 192.2 g. (1.43 mols) of $CH_3HSi(OC_2H_5)_2$. Yield of $CH_3HSi(OC_2H_5)_2$ was 70 per cent of theoretical.

Example 4

209.5 g. (1.77 mols) of $(CH_3)_3SiOC_2H_5$ were added to 200 g. (1.13 mols) of $C_6H_5HSiCl_2$ in solution with diethyl benzene (this is equivalent to 0.85 mol of the pure product). During the addition, the pot temperature gradually rose to 50° C. Upon completion of the reaction, the following compounds were obtained by fractionally distilling the mixture: 165.7 g. (1.53 mols) of $(CH_3)_3SiCl$, 34.3 g. (.344 mol) of $(CH_3)_3SiOC_2H_5$, 87.8 g. (.665 mol) of diethyl benzene, and 78.9 g. (0.40 mol) of $C_6H_5HSi(OC_2H_5)_2$, which represents a yield of 47% of theoretical of the last named compound.

Example 5

0.2 mol of $C_{11}H_{23}C_2H_5SiHCl$ and 0.25 mol of $Si(OC_2H_5)_4$ were combined, followed by warming of the mixture. Interchange was slow, and HCl gas was pased through the mixture to promote reaction. Heating was then resumed and interchange was accomplished with formation of $C_{11}H_{23}C_2H_5SiHOC_2H_5$ and $ClSi(OC_2H_5)_3$.

Having fully disclosed our invention, what we claim is:

1. The method of making alkoxy hydrosilanes which comprises reacting a silane ester having the formula $R_{4-n}Si(OR')_n$, wherein R is selected from the group consisting of alkyl and aryl radicals, R' is an alkyl radical, and n is a positive integer from 1 to 4, in liquid phase in the presence of free acid, with a silane having bonded to the silicon one hydrogen substituent and at least one chlorine substituent, the remaining silicon bonds, if any, being satisfied by monovalent hydrocarbon radicals selected from the group consisting of alkyl and aryl radicals, whereby interchange is accomplished between at least one alkoxy radical of the silane ester and a chlorine atom of the silane.

2. The method of making alkoxy hydrosilanes which comprises reacting a silane ester having the formula $R_{4-n}Si(OR')_n$, wherein R is selected from the group consisting of alkyl and aryl radicals, R' is an alkyl radical, and n is a positive integer from 1 to 4, in liquid phase in the presence of free acid with a silane having bonded to the silicon one hydrogen substituent, and at least one chlorine substituent, the remaining silicon bonds, if any, being satisfied by monovalent hydrocarbon radicals selected from the group consisting of alkyl and aryl radicals, whereby interchange is accomplished with the replacement of all chlorine substituents on the silane by alkoxy groups from the silane ester.

3. The method of making alkoxy hydrosilanes which comprises reacting a silane ester having the formula $R_{4-n}Si(OR')_n$, wherein R is selected from the group consisting of alkyl and aryl radicals, R' is an alkyl radical, and n is a positive integer equal to 1–4 inclusive, in liquid phase in the presence of HCl formed in situ with a silane having bonded to the silicon one hydrogen substituent and at least one chlorine substituent, the remaining silicon bonds, if any, being satisfied with monovalent hydrocarbon radicals selected from the group consisting of alkyl and aryl radicals, whereby interchange is accomplished between at least one alkoxy radical, of the silane ester, and a chlorine atom of the silane, and separating the products of the reaction.

4. The method of making alkoxy hydrosilanes which comprises reacting a silane ester having the formula $R_{4-n}SiOR'_n$, wherein R is selected from the group consisting of alkyl and aryl radicals, R' is an alkyl radical and $n$ is a positive integer not greater than 4 in liquid phase in the presence of free acid with a silane having the general formula $R_mHSiCl_{3-m}$, wherein R is selected from the group consisting of alkyl and aryl radicals and $m$ is an integer equal to 0 to 2, whereby interchange is accomplished between at least one alkoxy radical of the silane ester and a chlorine atom of the silane.

5. The method of making alkoxy hydrosilanes which comprises reacting a silane ester having the formula $R_{4-n}SiOR'_n$, wherein R is selected from the group consisting of alkyl and aryl radicals, R' is an alkyl radical and $n$ is a positive integer not greater than 4, in liquid phase in the presence of free acid, with a silane having the general formula $R_mHSiCl_{3-m}$, wherein R is selected from the group consisting of alkyl and aryl radicals and $m$ is an integer from 1 to 2, whereby interchange is accomplished between at least one alkoxy radical of the silane ester and a chlorine atom of the silane.

6. The method of making alkoxy hydrosilanes which comprises reacting $Si(OR')_4$, wherein R' is an alkyl radical with a silane having the formula $R_mHSiCl_{3-m}$, wherein R is selected from the group consisting of alkyl and aryl radicals, and $m$ is an integer from 1 to 2, in the presence of free acid whereby interchange is accomplished between at least one alkoxy radical of the silane ester and a chlorine atom of the silane.

7. The method of making alkoxy hydrosilanes, which comprises reacting an alkoxy silane with a hydrochlorosilane, in liquid phase, in the presence of free acid, whereby interchange is accomplished between at least one alkoxy group of the alkoxy silane and a chlorine atom of the hydrochlorosilane.

MELVIN J. HUNTER.
PHILIP C. SERVAIS.

REFERENCES CITED

The following references are of record in the file of this patent:

UNITED STATES PATENTS

| Number | Name | Date |
|---|---|---|
| 2,421,653 | Sauer | June 3, 1947 |

OTHER REFERENCES

Post: "The Chemistry of Aliphatic Orthoesters," pp. 121, 123, 128, 134, Reinhold publishers, N. Y. (1943).

Peppard: "Jour. Am. Chem. Soc.," vol. 68, (1946), pp. 77–79.

Calingaert: "Jour. Am. Chem. Soc.," vol. 61, pp. 2748–54.